US 9,831,759 B2

(12) United States Patent
Jasim et al.

(10) Patent No.: US 9,831,759 B2
(45) Date of Patent: Nov. 28, 2017

(54) VOLTAGE SOURCE CONVERTER

(71) Applicant: GENERAL ELECTRIC TECHNOLOGY GmbH, Baden (CH)

(72) Inventors: Omar Fadhel Jasim, Wollaton (GB); David Reginald Trainer, Alvaston (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 0 days.

(21) Appl. No.: 15/027,669

(22) PCT Filed: Oct. 6, 2014

(86) PCT No.: PCT/EP2014/071362
§ 371 (c)(1),
(2) Date: Apr. 6, 2016

(87) PCT Pub. No.: WO2015/052142
PCT Pub. Date: Apr. 16, 2015

(65) Prior Publication Data
US 2016/0241127 A1  Aug. 18, 2016

(30) Foreign Application Priority Data
Oct. 7, 2013  (EP) ..................... 13275246

(51) Int. Cl.
*H02M 1/12* (2006.01)
*H02M 7/483* (2007.01)
(Continued)

(52) U.S. Cl.
CPC .............. *H02M 1/12* (2013.01); *H02M 1/14* (2013.01); *H02M 7/04* (2013.01); *H02M 7/483* (2013.01); *H02M 2007/4835* (2013.01)

(58) Field of Classification Search
CPC ........................................ H02M 1/12
(Continued)

(56) References Cited

U.S. PATENT DOCUMENTS 4,053,820 A * 10/1977 Peterson ................. H02J 3/01
307/3
4,663,702 A * 5/1987 Tanaka ............... H02M 5/4505
363/65
(Continued)

FOREIGN PATENT DOCUMENTS

EP  2 782 239 A1  9/2014
EP  2 852 019 A1  3/2015
(Continued)

OTHER PUBLICATIONS

Extended European Search Report for EP Application. No. 13275246, dated Sep. 18, 2014, 5 pages.
(Continued)

*Primary Examiner* — Adolf Berhane
*Assistant Examiner* — Nusrat Quddus
(74) *Attorney, Agent, or Firm* — GE Global Patent Operation; Scott R. Stanley

(57) ABSTRACT

A voltage source converter includes at least one limb connected between DC terminals, the or each limb including: a phase element including switching elements to interconnect a DC electrical network and an AC electrical network; an auxiliary sub-converter configured to be controllable to act as a waveform synthesizer to modify a first DC voltage presented to the DC electrical network; and a tertiary sub-converter connected in parallel with the electrical block and controllable to act as a waveform synthesizer to modify a second DC voltage presented to a DC side of the phase element, the tertiary sub-converter (39) including at least one energy storage device. The voltage source converter
(Continued)

includes a controller configured to selectively control the or each tertiary sub-converter to synthesize at least one tertiary voltage component so as to transfer energy to or from that tertiary sub-converter and thereby regulate an energy level of that tertiary sub-converter.

24 Claims, 11 Drawing Sheets

(51) Int. Cl.
*H02M 1/14* (2006.01)
*H02M 7/04* (2006.01)

(58) Field of Classification Search
USPC .................. 363/35–39, 44, 65–68, 125–132; 323/205–208, 266
See application file for complete search history.

(56) References Cited

U.S. PATENT DOCUMENTS

| | | | | |
|---|---|---|---|---|
| 4,816,736 | A * | 3/1989 | Dougherty | H02J 7/1423 320/116 |
| 5,093,583 | A * | 3/1992 | Mashino | B60L 3/00 219/203 |
| 5,345,375 | A * | 9/1994 | Mohan | H02J 3/01 307/105 |
| 5,499,178 | A * | 3/1996 | Mohan | H02J 3/01 307/105 |
| 5,515,264 | A * | 5/1996 | Stacey | H02M 7/49 363/132 |
| 5,719,486 | A * | 2/1998 | Taniguchi | H02J 7/1438 322/24 |
| 5,726,557 | A * | 3/1998 | Umeda | H02J 7/14 320/104 |
| 5,889,667 | A * | 3/1999 | Bernet | H02M 7/797 323/239 |
| 5,892,677 | A * | 4/1999 | Chang | H02M 5/293 363/152 |
| 6,134,126 | A * | 10/2000 | Ikekame | H02J 3/01 307/105 |
| 6,236,580 | B1 * | 5/2001 | Aiello | H02M 7/49 363/37 |
| 6,301,130 | B1 * | 10/2001 | Aiello | H02M 7/49 363/37 |
| 6,320,767 | B1 * | 11/2001 | Shimoura | H02M 7/49 363/37 |
| 6,392,348 | B1 * | 5/2002 | Dougherty | H02J 7/1423 315/82 |
| 7,298,115 | B2 * | 11/2007 | Nishimura | H02P 9/30 322/28 |
| 2003/0202367 | A1 * | 10/2003 | Schreiber | H02M 5/458 363/72 |
| 2005/0146226 | A1 * | 7/2005 | Trainer | H02M 1/12 307/73 |
| 2008/0007978 | A1 * | 1/2008 | Han | H02M 7/19 363/35 |
| 2009/0027934 | A1 * | 1/2009 | Robledo Bustos | H02M 7/2173 363/126 |
| 2009/0102436 | A1 * | 4/2009 | Escobar Valderrama | H02J 3/1857 323/207 |
| 2010/0067266 | A1 * | 3/2010 | Dommaschk | H02M 7/483 363/64 |
| 2011/0018481 | A1 * | 1/2011 | Hiller | H02M 7/483 318/400.26 |
| 2012/0069610 | A1 * | 3/2012 | Trainer | H02M 7/49 363/35 |
| 2013/0128629 | A1 | 5/2013 | Clare et al. | |

FOREIGN PATENT DOCUMENTS

| | | |
|---|---|---|
| EP | 2 852 043 A1 | 3/2015 |
| EP | 2 916 447 A1 | 9/2015 |
| GB | 2519793 A | 5/2015 |
| WO | WO 2010/088969 A1 | 8/2010 |
| WO | WO 2010/149200 A1 | 12/2010 |
| WO | WO 2011/127980 A1 | 10/2011 |
| WO | WO 2012/163841 A1 | 12/2012 |
| WO | WO 2014/146852 A2 | 9/2014 |
| WO | WO 2015/040218 A1 | 3/2015 |
| WO | WO 2015/062975 A1 | 5/2015 |
| WO | WO 2015/158402 A1 | 10/2015 |

OTHER PUBLICATIONS

International Search Report and Written Opinion for International Application No. PCT/EP2014/071362, dated Mar. 27, 2015, 6 pages.
Amankwah, E.K., et al., "Cell capacitor voltage control in a parallel hybrid modular multilevel voltage source converter for HVDC applications," Power Electronics, Machines and Drives (PEMD 2012), 6th IET International Conference, pp. 1-6 (Mar. 27-29, 2012).
Tomasini, M., et al., "DC-Link voltage ripple minimization in a modular multilevel voltage source converter for HVDC power transmission," Proceedings of the 2011-14th European Conference on Power Electronics and Applications, pp. 1-10 (Aug. 30, 2011).
Feldman, R., et al., "A hybrid voltage source converter arrangement for HVDC power transmission and reactive power compensation," $5^{th}$ IET International Conference on Power Electronics, pp. 1-6 (Apr. 19-21, 2010).
Feldman, R., et al., "A low loss modular multilevel voltage source converter for HVDC power transmission and reactive power compensation," $9^{th}$ IET International Conference on AC and DC Power Transmission, pp. 1-5 (2010).
Trainer, D.R., et al., "A new Hybrid Voltage-Sourced Converter for HVDC Power Transmission", Cigre, pp. 1-12 (2010).

* cited by examiner

VOLTAGE SOURCE CONVERTER

CROSS-REFERENCE TO RELATED APPLICATIONS

The present application is a National Stage of International Application No. PCT/EP2014/071362, filed Oct. 6, 2014, which claims the benefit of and priority to European Application No. 13275246, filed Oct. 7, 2013, which is incorporated herein by reference in its entirety.

This invention relates to a voltage source converter.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC electrical networks operating at different frequencies. In any such power transmission network, converters are required at each interface between AC and DC power to effect the required conversion, and one such form of converter is a voltage source converter (VSC).

According to a first aspect of the invention, there is provided a voltage source converter comprising first and second DC terminals for connection to a DC electrical network, the voltage source converter further including at least one limb connected between the first and second DC terminals, the or each limb including:

a phase element including a plurality of switching elements to interconnect the DC electrical network and an AC electrical network;

an auxiliary sub-converter configured to be controllable to act as a waveform synthesizer to modify a first DC voltage presented to the DC electrical network; and a tertiary sub-converter connected with the phase element in an electrical block, the auxiliary sub-converter being connected in parallel with the electrical block, the tertiary sub-converter being configured to be controllable to act as a waveform synthesizer to modify a second DC voltage presented to a DC side of the phase element, the tertiary sub-converter including at least one energy storage device;

wherein the voltage source converter further includes a controller configured to selectively control the or each tertiary sub-converter to synthesize at least one tertiary voltage component so as to transfer energy to or from that tertiary sub-converter and thereby regulate an energy level of that tertiary sub-converter.

Operation of the voltage source converter to transfer power between the AC and DC electrical networks could result in energy accumulation in (or energy loss from) at least one energy storage device, thus resulting in deviation of the energy level of at least one energy storage device from a reference value.

Such a deviation is undesirable because, if too little energy is stored within a given energy storage device then the voltage the corresponding module is able to generate is reduced, whereas if too much energy is stored in a given energy storage device then over-voltage problems may arise. The former would require the addition of a power source to restore the energy level of the affected energy storage device to the reference value, while the latter would require an increase in voltage rating of one or more energy storage devices to prevent the over-voltage problems, thus adding to the overall size, weight and cost of the voltage source converter. In addition if too little energy is stored within a given energy storage device then the voltage source converter might trip due to under-voltage protection.

The configuration of the voltage source converter according to the invention allows energy to be transferred to and from the or each tertiary sub-converter to regulate the energy stored in one or more corresponding energy storage devices, thereby obviating the problems associated with a deviation of the energy level of at least one energy storage device from the reference value.

Optionally the magnitude of the or each tertiary voltage component may be altered in order to adjust the amount of energy transferred to or from the or each tertiary sub-converter.

When the voltage source converter includes a plurality of limbs connected between the first and second DC terminals, regulation of the energy level of each tertiary sub-converter may involve balancing of the energy levels of the plurality of tertiary sub-converters. This is useful when there is an imbalance in the energy levels of the plurality of tertiary sub-converters, which could be caused by, for example, an imbalance of the plurality of phase currents drawn from the multi-phase AC electrical network, or component failure in one or more modules of at least one tertiary sub-converter leading to a reduction in energy storage capacity.

In embodiments of the invention, the controller may be configured to selectively control the or each tertiary sub-converter to synthesize at least one tertiary voltage component so as to transfer energy to or from that tertiary sub-converter and thereby minimise a net change in energy level of that tertiary sub-converter. This further enhances the regulation of the energy level of the or each tertiary sub-converter, and therefore any associated regulation of the energy stored in a given energy storage device.

Regulation of the energy level of the or each tertiary sub-converter to minimise a net change in energy level of that tertiary sub-converter preferably is carried out over a defined period of time, e.g. a single power frequency cycle.

In further embodiments of the invention, the controller may be configured to selectively control the or each auxiliary sub-converter to synthesize an auxiliary voltage component that is in anti-phase with the respective tertiary voltage component. Control of the or each auxiliary sub-converter ensures that the or the respective second DC voltage, and therefore the AC voltage at the AC side of the or the respective phase element, remains unmodified during the generation of the or each tertiary voltage component. Thus, energy level regulation of the or each tertiary sub-converter may be carried out at any time during the operation of the voltage source converter without affecting the power transfer between the AC and DC electrical networks.

The or each tertiary voltage component may be a positive integer multiple of a $2^{nd}$ harmonic voltage component. Synthesis of at least one tertiary voltage component that is a positive integer multiple of a $2^{nd}$ harmonic voltage component enables summation of the first DC voltages when the voltage source converter includes a plurality of limbs connected between the first and second DC terminals, thus leaving a combined, ripple-free DC voltage for presentation to the DC electrical network.

The or each tertiary voltage component is preferably a $2^{nd}$ harmonic voltage component, a $4^{th}$ harmonic component, an $8^{th}$ harmonic component or a $10^{th}$ harmonic component. It will be appreciated that the or each tertiary voltage component may be a $(3(2n-1)\pm1)^{th}$ harmonic voltage component, whereby n is a positive integer multiple. This not only prevents undesirable ripple harmonic components, each of which is a positive integer multiple of a $6^{th}$ harmonic component, from appearing in the or the respective first DC voltage presented to the DC electrical network.

The or each tertiary voltage component may have the same frequency as a current component of a current flowing through the corresponding tertiary sub-converter. This provides a reliable means of producing real power when transferring energy to or from the or each tertiary sub-converter.

Optionally the controller may be configured to selectively control the or each tertiary sub-converter to modify a phase angle of the or each tertiary voltage component relative to a phase angle of a current flowing through the or each tertiary sub-converter. Control of the or each tertiary sub-converter in this manner permits adjustment of the amount of energy transferred to or from the or each tertiary sub-converter, and thereby provides an additional way of regulating the energy level of the or each tertiary sub-converter.

Further optionally the controller may be configured to selectively control the or each tertiary sub-converter to synthesize the or each tertiary voltage component to be in phase with a current component of a current flowing through that tertiary sub-converter. Control of the or each tertiary sub-converter in this manner maximises the amount of energy transferred to or from the or each tertiary sub-converter, and thereby optimises the operation of the voltage source converter to regulate the energy level of the or each tertiary sub-converter.

According to a second aspect of the invention, there is provided a voltage source converter comprising first and second DC terminals for connection to a DC electrical network, the voltage source converter further including a plurality of limbs connected between the first and second DC terminals, each limb including:

a phase element including a plurality of switching elements to interconnect the DC electrical network and an AC electrical network; and an auxiliary sub-converter configured to be controllable to act as a waveform synthesizer to modify a first DC voltage presented by the limb to the DC electrical network, wherein the voltage source converter further includes a controller configured to selectively control each auxiliary sub-converter to modify the respective first DC voltage to include at least two auxiliary harmonic components, each auxiliary harmonic component being a positive integer multiple of a $2^{nd}$ harmonic component.

The configuration of the controller to control each auxiliary sub-converter in this manner enables summation of the first DC voltages, thus leaving a combined, ripple-free DC voltage for presentation to the DC electrical network. This thereby permits a reduction in rating of associated filtering hardware configured to cancel one or more harmonic components present in an AC voltage at the AC side of each phase element, since the associated filtering hardware would not be required to filter the auxiliary harmonic components.

Preferably the controller is configured to selectively control each auxiliary sub-converter to modify the respective first DC voltage to operate at a phase difference to the other two first DC voltages in order to cancel out the auxiliary harmonic components when the first DC voltages are summed. For example, when the voltage source converter has three limbs, each first DC voltage may be modified to operate at a phase difference of 120 electrical degrees to the other two first DC voltages in order to cancel out the auxiliary harmonic components when the first DC voltages are summed.

Each auxiliary harmonic component is preferably a $2^{nd}$ harmonic component, a $4^{th}$ harmonic component, an $8^{th}$ harmonic component or a $10^{th}$ harmonic component. It will be appreciated that each auxiliary harmonic component may be a $(3(2n-1)\pm1)^{th}$ harmonic component, whereby n is a positive integer multiple. This not only results in formation of a combined, ripple-free DC voltage for presentation to the DC electrical network, but also prevents undesirable ripple harmonic components, each of which is a positive integer multiple of a $6^{th}$ harmonic component, from appearing in the combined DC voltage presented to the DC electrical network.

In embodiments of the second aspect of the invention, each limb may further include a tertiary sub-converter configured to be controllable to act as a waveform synthesizer to modify a respective second DC voltage presented to a DC side of the respective phase element, and the controller is configured to selectively control each tertiary sub-converter to synthesize a voltage waveform that includes at least one tertiary harmonic component, the or each tertiary harmonic component being a positive integer multiple of a $6^{th}$ harmonic component.

The configuration of the controller to control each tertiary sub-converter in this manner permits active filtering of undesirable ripple harmonic components, each of which is a positive integer multiple of a $6^{th}$ harmonic component, that are present in the respective second DC voltage and thereby prevents the undesirable ripple harmonic components from appearing in the respective first DC voltage presented to the DC electrical network.

Furthermore, the configuration of the controller to control each auxiliary sub-converter to modify the respective first DC voltage to include the auxiliary harmonic components removes the need to control each tertiary sub-converter to actively filter undesirable ripple harmonic components that are not positive integer multiples of a $6^{th}$ harmonic component, thus reducing the required voltage rating of each tertiary sub-converter.

In contrast, an alternative solution involves controlling each auxiliary sub-converter to synthesize one or more zero-phase sequence triplen harmonic components (e.g. $3^{rd}$, $9^{th}$ and $15^{th}$ harmonic components) to cancel the undesirable ripple harmonic components, each of which is a positive integer multiple of a $6^{th}$ harmonic component, that are present in the first DC voltage. Synthesis of one or more zero-phase sequence triplen harmonic components by each auxiliary sub-converter however means that use of a delta-connected plurality of transformer primary windings to interconnect the AC electrical network and the AC side of each phase element results in a driving voltage around the delta-connected plurality of transformer primary windings, thus providing a path for a significant, continuous zero-phase sequence current to flow in the delta-connected plurality of transformer primary windings. Similarly use of a star-connected plurality of transformer primary windings, with a grounded neutral point, to interconnect the AC electrical network and the AC side of each phase element provides a path for a significant, continuous zero-phase sequence current to flow in the star-connected plurality of transformer primary windings.

The synthesis of a voltage waveform that includes at least one tertiary harmonic component by each tertiary sub-converter obviates the need to control each auxiliary sub-converter to synthesize one or more zero-phase sequence triplen harmonic components. This in turn permits use of a star-connected plurality of transformer primary windings with a grounded neutral point, which could be desirable for high power applications.

In further embodiments of the second aspect of the invention, each limb may further include a tertiary sub-converter configured to be controllable to act as a waveform synthesizer to modify a second DC voltage presented to a DC side of the corresponding phase element, and the controller is configured to selectively control each tertiary sub-converter to modify the respective second DC voltage into a near-approximation of an offset rectified sinusoidal waveform for presentation to the DC side of the respective phase element when the respective auxiliary sub-converter is controlled to modify the respective first DC voltage to include the auxiliary harmonic components.

Modification of the respective second DC voltage into a near-approximation of an offset rectified sinusoidal waveform for presentation to the DC side of the respective phase element results in formation of high quality AC sinusoidal waveforms with minimal harmonic distortion at the AC sides of the phase elements.

Such modification of the respective second DC voltage by each tertiary sub-converter may be carried out by, for example, simultaneously controlling:

- each auxiliary sub-converter to modify the respective first DC voltage to include at least two auxiliary harmonic components, each auxiliary harmonic component being a positive integer multiple of a $2^{nd}$ harmonic component; and
- each tertiary sub-converter to synthesize a voltage waveform that includes at least one tertiary harmonic component, the or each tertiary harmonic component being a positive integer multiple of a $6^{th}$ harmonic component.

According to a third aspect of the invention, there is provided a voltage source converter comprising first and second DC terminals for connection to a DC electrical network, the voltage source converter further including at least one limb connected between the first and second DC terminals, the or each limb including:

- a phase element including a plurality of switching elements to interconnect the DC electrical network and an AC electrical network;
- an auxiliary sub-converter configured to be controllable to act as a waveform synthesizer to modify a first DC voltage presented to the DC electrical network; and
- a tertiary sub-converter connected with the phase element in an electrical block, the auxiliary sub-converter being connected in parallel with the electrical block, the tertiary sub-converter being configured to be controllable to act as a waveform synthesizer to modify a second DC voltage presented to a DC side of the phase element, wherein the voltage source converter further includes a controller configured to selectively control the or each tertiary sub-converter to generate a compensatory DC voltage component for presentation to the DC side of the or the respective phase element so as to compensate for a change in real power and/or reactive power generated or absorbed at an AC side of the or the respective phase element.

The configuration of the controller to control the or each tertiary sub-converter in this manner inhibits any effect a change in real power and/or reactive power generated or absorbed at an AC side of the or the respective phase element might have on the operation of the DC side of the voltage source converter. This thereby prevents any undesirable change in the DC side of the voltage source converter that would have otherwise resulted from the change in real power and/or reactive power generated or absorbed at an AC side of the or the respective phase element.

In contrast, an alternative solution involves controlling the or each auxiliary sub-converter to synthesize one or more zero-phase sequence triplen harmonic components (e.g. $3^{rd}$, $9^{th}$ and $15^{th}$ harmonic components) to compensate for any change in the DC side of the voltage source converter caused by a change in real power and/or reactive power generated or absorbed at an AC side of the or the respective phase element. As mentioned above, synthesis of one or more zero-phase sequence triplen harmonic components by the or each auxiliary sub-converter however means that use of a delta-connected plurality of transformer primary windings to interconnect the AC electrical network and the AC side of the or each phase element results in a driving voltage around the delta-connected plurality of transformer primary windings, thus providing a path for a significant, continuous zero-phase sequence current to flow in the delta-connected plurality of transformer primary windings. Similarly use of a star-connected plurality of transformer primary windings, with a grounded neutral point, to interconnect the AC electrical network and the AC side of each phase element provides a path for a significant, continuous zero-phase sequence current to flow in the star-connected plurality of transformer primary windings.

The control of the or each tertiary sub-converter to generate a compensatory DC voltage component for presentation to the DC side of the or the respective phase element so as to compensate for a change in real power and/or reactive power generated or absorbed at an AC side of the or the respective phase element obviates the need to control the or each auxiliary sub-converter to synthesize one or more zero-phase sequence triplen harmonic components. This in turn permits use of a star-connected plurality of transformer primary windings with a grounded neutral point, which could be desirable for high power applications.

The controller may be configured to selectively control the or each tertiary sub-converter to generate a compensatory DC voltage component for presentation to the DC side of the or the respective phase element so as to compensate for a change in the or the respective second DC voltage caused by the change in real power and/or reactive power generated or absorbed at an AC side of the or the respective phase element. This thereby prevents any undesirable change in the operation of the DC side of the voltage source converter that would have otherwise resulted from the change in the or the respective second DC voltage.

The controller may be configured to selectively control the or each tertiary sub-converter to generate a compensatory DC voltage component for presentation to the DC side of the or the respective phase element so as to compensate for a change in the or the respective second DC voltage caused by the change in real power and/or reactive power generated or absorbed at an AC side of the or the respective phase element and thereby inhibit the change in the or the respective second DC voltage from modifying the or the respective first DC voltage. This thereby prevents any undesirable change in the or the respective first DC voltage that would have otherwise resulted from the change in the or the respective second DC voltage.

The configuration of the voltage source converter according to the third aspect of the invention therefore permits operation of the voltage source converter over a wide range of real power and reactive power with little to zero detrimental effect on the operation of the DC side of the voltage source converter.

According to a fourth aspect of the invention, there is provided a voltage source converter comprising first and second DC terminals for connection to a DC electrical network, the voltage source converter further including at least one limb connected between the first and second DC terminals, the or each limb including:

a phase element including a plurality of switching elements to interconnect the DC electrical network and an AC electrical network;

an auxiliary sub-converter configured to be controllable to act as a waveform synthesizer to modify a first DC voltage presented to the DC electrical network; and a tertiary sub-converter connected with the phase element in an electrical block, the auxiliary sub-converter being connected in parallel with the electrical block, the tertiary sub-converter being configured to be controllable to act as a waveform synthesizer to modify a second DC voltage presented to a DC side of the phase element, wherein the voltage source converter further includes a controller configured to selectively control the or each tertiary sub-converter and/or the or each auxiliary sub-converter in a fault operating mode so as to minimise a fault current flowing or block a fault current from flowing through the voltage source converter when a fault occurs, in use, in the DC electrical network.

The inclusion of the controller in the voltage source converter according to the fourth aspect of the invention permits control of the or each tertiary sub-converter and/or the or each auxiliary sub-converter, which is normally used to facilitate transfer of power between the AC and DC electrical networks, to reliably minimise or block a fault current. This thereby reduces or eliminates the need for additional fault current protection hardware (e.g. circuit breakers and surge arresters) to protect the voltage source converter from any detrimental effects of the fault current, thus resulting in an economical, space-saving voltage source converter that is capable of transferring power between the AC and DC electrical networks, but also minimising a fault current or blocking flow of a fault current through the voltage source converter resulting from a fault in the DC electrical network.

The controller may selectively control the or each auxiliary sub-converter in the fault operating mode so as to provide a zero DC voltage across the first and second DC terminals and thereby minimise a fault current flowing or block a fault current from flowing through the voltage source converter when a fault occurs, in use, in the DC electrical network.

The provision of the zero DC voltage across the first and second DC terminals inhibits a fault current from flowing between the first and second DC terminals via the or each auxiliary sub-converter. To provide the zero DC voltage across the first and second DC terminals, the or each auxiliary sub-converter may be controlled to set the or the respective first DC voltage to zero, or may be controlled so as to enable summation of a plurality of first DC voltages to define a zero DC voltage for presentation to the faulty DC electrical network when the voltage source converter includes a plurality of limbs connected between the first and second DC terminals.

The controller may be configured to selectively control the or each tertiary sub-converter and/or the or each auxiliary sub-converter in the fault operating mode so as to synthesize an opposing voltage that minimises a fault current flowing or blocks a fault current from flowing through the voltage source converter when a fault occurs, in use, in the DC electrical network.

Controlling the or each tertiary sub-converter and the or each auxiliary sub-converter in the fault operating mode to synthesize the opposing voltage permits distribution of the opposing voltage between the auxiliary and tertiary sub-converters, and thereby reduces the required individual voltage ratings of the or each tertiary sub-converter and the or each auxiliary sub-converter to enable synthesis of the opposing voltage.

The or each tertiary sub-converter and/or the or each auxiliary sub-converter may be controlled in the fault operating mode to synthesize a variety of voltages in order to synthesize the opposing voltage.

The controller may be configured to selectively control the or each tertiary sub-converter in the fault operating mode to synthesize a DC voltage.

Preferably the controller may be configured to selectively control the or each tertiary sub-converter in the fault operating mode to synthesize a DC voltage that is $2/\pi$ of the peak AC voltage at an AC side of the or the respective phase element. The synthesis of such a DC voltage reduces the required voltage rating of the or each tertiary sub-converter.

The controller may be configured to selectively control the or each tertiary sub-converter in the fault operating mode to optionally synthesize at least one tertiary voltage component, the or each tertiary voltage component being a positive integer multiple of a $6^{th}$ harmonic component, so as to synthesize the opposing voltage.

The configuration of the controller to control the or each tertiary sub-converter in this manner not only permits synthesis of the opposing voltage, but also permits active filtering of undesirable ripple harmonic components, each of which is a positive integer multiple of a $6^{th}$ harmonic component, that are present in the or the respective second DC voltage and thereby prevents the undesirable ripple harmonic components from appearing in the or the respective first DC voltage presented to the DC electrical network.

The controller may be configured to selectively control the or each auxiliary sub-converter in the fault operating mode to synthesize at least one auxiliary voltage component, the or each auxiliary voltage component being a $2^{nd}$ harmonic component, a $4^{th}$ harmonic component, an $8^{th}$ harmonic component or a $10^{th}$ harmonic component. It will be appreciated that the or each auxiliary voltage component may be a $(3(2n-1)\pm1)^{th}$ harmonic component, whereby n is a positive integer multiple.

Synthesis of at least one auxiliary voltage component that is a positive integer multiple of a $2^{nd}$ harmonic component not only may be used to help synthesize the opposing voltage to minimise the fault current or block the flow of fault current, but also enables summation of a plurality of first DC voltages to define a zero DC voltage for presentation to the faulty DC electrical network when the voltage source converter includes a plurality of limbs connected between the first and second DC terminals.

The or each auxiliary sub-converter may be configured as a bidirectional waveform synthesizer. The configuration of the or each auxiliary sub-converter in this manner provides a reliable means for generating the or each auxiliary voltage component.

The controller may be configured to selectively control the or each tertiary sub-converter and/or the or each auxiliary sub-converter in the fault operating mode to synthesize a voltage waveform so as to inhibit the or the respective phase element from conducting current. For example, when each switching element of the or the respective phase element is a diode, the controller may be configured to selectively control the or each tertiary sub-converter and/or the or each auxiliary sub-converter in the fault operating mode to synthesize a voltage waveform so as to reverse bias the plurality of diodes of the or the respective phase element.

It will be appreciated that the or each limb and its components may be configured in different ways to vary the topology of the voltage source converter.

In embodiments of the invention, at least one limb may include the auxiliary sub-converter being connected in parallel with an electrical block that includes the phase element.

In embodiments of the invention employing the use of at least one tertiary sub-converter, at least one limb may include an electrical block that includes a series connection of the tertiary sub-converter and phase element.

The configuration of the plurality of switching elements in each phase element may vary so long as the plurality of switching elements is capable of interconnecting a DC voltage and an AC voltage. For example, the plurality of switching elements in the or each phase element may include two parallel-connected pairs of series-connected switching elements, a junction between each pair of series-connected switching elements defining an AC terminal for connection to a respective phase of a multi-phase AC electrical network.

The manner in which each limb is connected between the first and second DC terminals may vary. For example, a plurality of limbs may be connected in series between the first and second DC terminals.

In further embodiments of the invention, the or each sub-converter may be a multilevel converter.

In still further embodiments of the invention, the or each sub-converter may include at least one module, the or each module including at least one switching element and at least one energy storage device, the or each switching element and the or each energy storage device in each module combining to selectively provide a voltage source.

The inclusion of the or each module in the or each sub-converter provides the or each sub-converter with a reliable means of acting as a waveform synthesizer.

The or each module in the or each sub-converter may vary in configuration.

In embodiments of the invention, the or each switching element and the or each energy storage device in each module may combine to selectively provide a unidirectional voltage source. For example, the or each module in the auxiliary sub-converter may include a pair of switching elements connected in parallel with an energy storage device in a half-bridge arrangement to define a 2-quadrant unipolar module that can provide zero or positive voltage and can conduct current in two directions.

In other embodiments of the invention, the or each switching element and the or each energy storage device in each module may combine to selectively provide a bidirectional voltage source. For example, the or each module in the tertiary sub-converter may include two pairs of switching elements connected in parallel with an energy storage device in a full-bridge arrangement to define a 4-quadrant bipolar module that can provide negative, zero or positive voltage and can conduct current in two directions.

The or each sub-converter may include a plurality of series-connected modules that defines a chain-link converter. The structure of the chain-link converter permits build up of a combined voltage across the chain-link converter, which is higher than the voltage available from each of its individual modules, via the insertion of the energy storage devices of multiple modules, each providing its own voltage, into the chain-link converter. In this manner switching of the or each switching element in each module causes the chain-link converter to provide a stepped variable voltage source, which permits the generation of a voltage waveform across the chain-link converter using a step-wise approximation. As such the chain-link converter is capable of providing a wide range of complex voltage waveforms for modifying the DC voltage at the DC side of the corresponding phase element.

At least one switching element may include at least one self-commutated switching device. The or each self-commutated switching device may be an insulated gate bipolar transistor, a gate turn-off thyristor, a field effect transistor, an injection-enhanced gate transistor, an integrated gate commutated thyristor or any other self-commutated switching device. The number of switching devices in each switching element may vary depending on the required voltage and current ratings of that switching element.

The or each switching element may further include a passive current check element that is connected in anti-parallel with the or each switching device.

The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy, e.g. a capacitor, fuel cell or battery.

It will be appreciated that each embodiment of each aspect of the invention may be optionally combined with one or more other embodiments of each other aspect of the invention.

It will also be appreciated that the use of the terms "tertiary" and "auxiliary" in the patent specification is merely intended to help distinguish between similar features (e.g. the auxiliary and tertiary sub-converters), and is not intended to indicate the relative importance of one feature over another feature.

Preferred embodiments of the invention will now be described, by way of non-limiting examples only, with reference to the accompanying drawings in which:

FIG. 1 shows, in schematic form, a voltage source converter according to a first embodiment of the invention;

FIGS. 2a and 2b respectively show, in schematic form, the structure of a 2-quadrant unipolar module and a 4-quadrant bipolar module;

Figure 1:
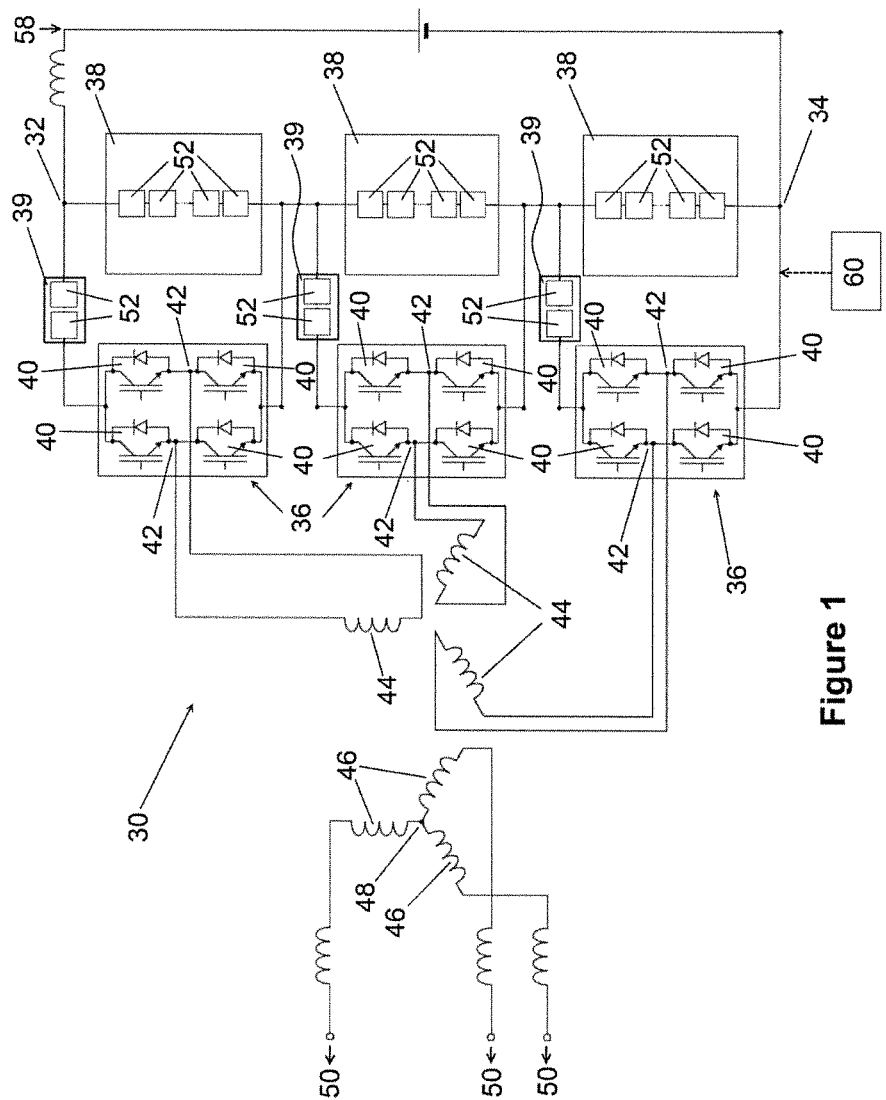

A first voltage source converter 30 according to a first embodiment of the invention is shown in FIG. 1.

The first voltage source converter 30 comprises first and second DC terminals 32,34, a plurality of phase elements 36, a plurality of auxiliary sub-converters 38, and a plurality of tertiary sub-converters 39.

Each phase element 36 includes two parallel-connected pairs of series-connected switching elements 40. A junction between each pair of series-connected switching elements 40 defines an AC terminal. The AC terminals of each phase element 36 define the AC side 42 of that phase element 36.

In use, the AC terminals of each phase element 36 are interconnected by a respective one of a plurality of open secondary transformer windings 44. Each secondary transformer winding 44 is mutually coupled with a respective one of a plurality of primary transformer windings 46. The plurality of primary transformer windings 46 are connected in a star configuration in which a first end of each primary transformer winding 46 is connected to a common junction 48 and a second end of each primary transformer winding 46 is connected to a respective phase of a three-phase AC electrical network 50. In this manner, in use, the AC side 42 of each phase element 36 is connected to a respective phase of a three-phase AC electrical network 50.

The common junction 48 defines a neutral point of the plurality of primary transformer windings 46, and is grounded (not shown).

Each phase element 36 is connected in series with a respective one of the plurality of tertiary sub-converters 39 to define an electrical block. Each auxiliary sub-converter 38 is connected in parallel with a respective one of the electrical blocks to form a limb.

Each sub-converter 38,39 includes a plurality of modules 52.

Figure 2A:
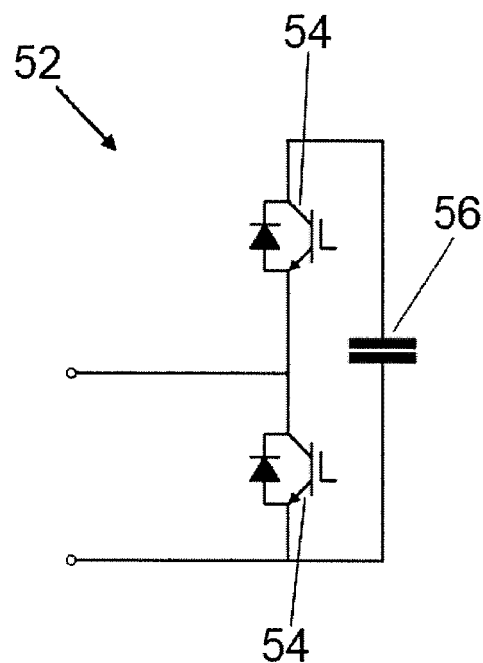

Each module 52 of each auxiliary sub-converter 38 includes a pair of switching elements 54 and an energy storage device 56 in the form of a capacitor. In each auxiliary sub-converter 38, the pair of switching elements 54 is connected in parallel with the capacitor 56 in a half-bridge arrangement to define a 2-quadrant unipolar module that can provide zero or positive voltage and can conduct current in two directions, as shown in FIG. 2a.

Figure 2B:
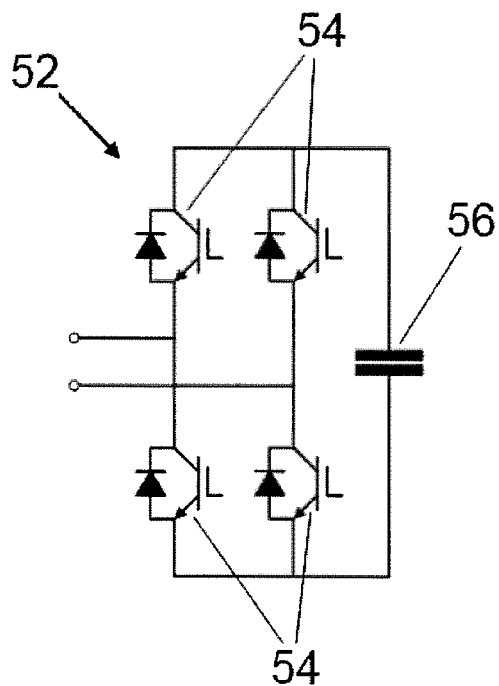

Each module 52 of each tertiary sub-converter includes two pairs of switching elements 54 and an energy storage device 56 in the form of a capacitor. In each tertiary sub-converter 38, the pairs of switching elements 54 are connected in parallel with the capacitor 56 in a full-bridge arrangement to define a 4-quadrant bipolar module that can provide negative, zero or positive voltage and can conduct current in two directions, as shown in FIG. 2b.

The plurality of limbs is connected in series between the first and second DC terminals 32,34. In use, the first and second DC terminals 32,34 are respectively connected to first and second terminals of a DC electrical network 58, the first terminal of the DC electrical network 58 carrying a positive DC voltage, the second terminal of the DC electrical network 58 carrying a negative DC voltage.

The configuration of each limb as set out above means that, in use, a DC voltage appears across the parallel-connected pairs of series-connected switching elements 40 of each phase element 36.

As such, in use, each phase element 36 interconnects a DC voltage and an AC voltage. In other embodiments, it is envisaged that each phase element may include a plurality of switching elements with a different configuration to interconnect a DC voltage and an AC voltage.

Each switching element 40,54 includes a single switching device. Each switching element 40,54 further includes a passive current check element that is connected in anti-parallel with each switching device.

Each switching device is in the form of an insulated gate bipolar transistor (IGBT). It is envisaged that, in other embodiments of the invention, each IGBT may be replaced by a gate turn-off thyristor, a field effect transistor, an injection-enhanced gate transistor, an integrated gate commutated thyristor or any other self-commutated switching device. The number of switching devices in each switching element may vary depending on the required voltage rating of that switching element.

Each passive current check element includes a passive current check device in the form of a diode. It is envisaged that, in other embodiments, each diode may be replaced by any other device that is capable of limiting current flow in only one direction. The number of passive current check devices in each passive current check element may vary depending on the required voltage rating of that passive current check element.

It is further envisaged that, in other embodiments of the invention, each capacitor may be replaced by another type of energy storage device that is capable of storing and releasing energy, e.g. a fuel cell or battery.

The plurality of series-connected modules 52 in each sub-converter 38,39 defines a chain-link converter.

The capacitor 56 of each module 52 is selectively bypassed or inserted into the chain-link converter by changing the states of the switching elements 54. This selectively directs current through the capacitor 56 or causes current to bypass the capacitor 56 so that the module 52 provides a zero or positive voltage in the case of each auxiliary sub-converter 38, and the module 52 provides a negative, zero or positive voltage in the case of each tertiary sub-converter 39.

The capacitor 56 of the module 52 is bypassed when the switching elements 54 in the module 52 are configured to form a short circuit in the module 52. This causes current in the chain-link converter to pass through the short circuit and bypass the capacitor 56, and so the module 52 provides a zero voltage, i.e. the module 52 is configured in a bypassed mode.

The capacitor 56 of the module 52 is inserted into the chain-link converter when the switching elements 54 in the module 52 are configured to allow the current in the chain-link converter to flow into and out of the capacitor 56. The capacitor 56 then charges or discharges its stored energy so as to provide a non-zero voltage, i.e. the module 52 is configured in a non-bypassed mode.

It is envisaged that, in other embodiments of the invention, each module may be replaced by another type of module that includes at least one switching element and at least one energy storage device, the or each switching element and the or each energy storage device in the or each module combining to selectively provide a voltage source.

The structure of the chain-link converter permits build up of a combined voltage across the chain-link converter, which is higher than the voltage available from each of its individual modules 52, via the insertion of the energy storage devices 56 of multiple modules 52, each providing its own voltage, into the chain-link converter. In this manner switching of each switching element 54 in each module 52 causes the chain-link converter to provide a stepped variable voltage source, which permits the generation of a voltage waveform across the chain-link converter using a step-wise approximation. As such each chain-link converter is capable of providing a wide range of complex voltage waveforms.

The parallel connection of the auxiliary sub-converter 38 and electrical block in each limb permits the auxiliary sub-converter 38 to selectively act as a waveform synthesizer to modify a first DC voltage that is presented to the DC electrical network.

The series connection of the tertiary sub-converter 39 and phase element 36 in each limb permits the tertiary sub-converter 39 to selectively act as a waveform synthesizer to modify a second DC voltage at a DC side of the corresponding phase element 36. Such modification of the DC voltage at the DC side of the corresponding phase element 36 results in a corresponding modification of the AC voltage at the AC side 42 of the corresponding phase element 36.

It is envisaged that, in other embodiments of the invention, the configuration of each auxiliary sub-converter may vary as long as each auxiliary sub-converter is capable of selectively acting as a waveform synthesizer to modify the first DC voltage, and the configuration of each tertiary sub-converter may vary as long as each tertiary sub-converter is capable of selectively acting as a waveform synthesizer to modify the second DC voltage. For example, each auxiliary sub-converter may be a multilevel converter.

The first voltage source converter 30 further includes a controller 60 configured to control the auxiliary and tertiary sub-converters 38,39.

Figure 4:
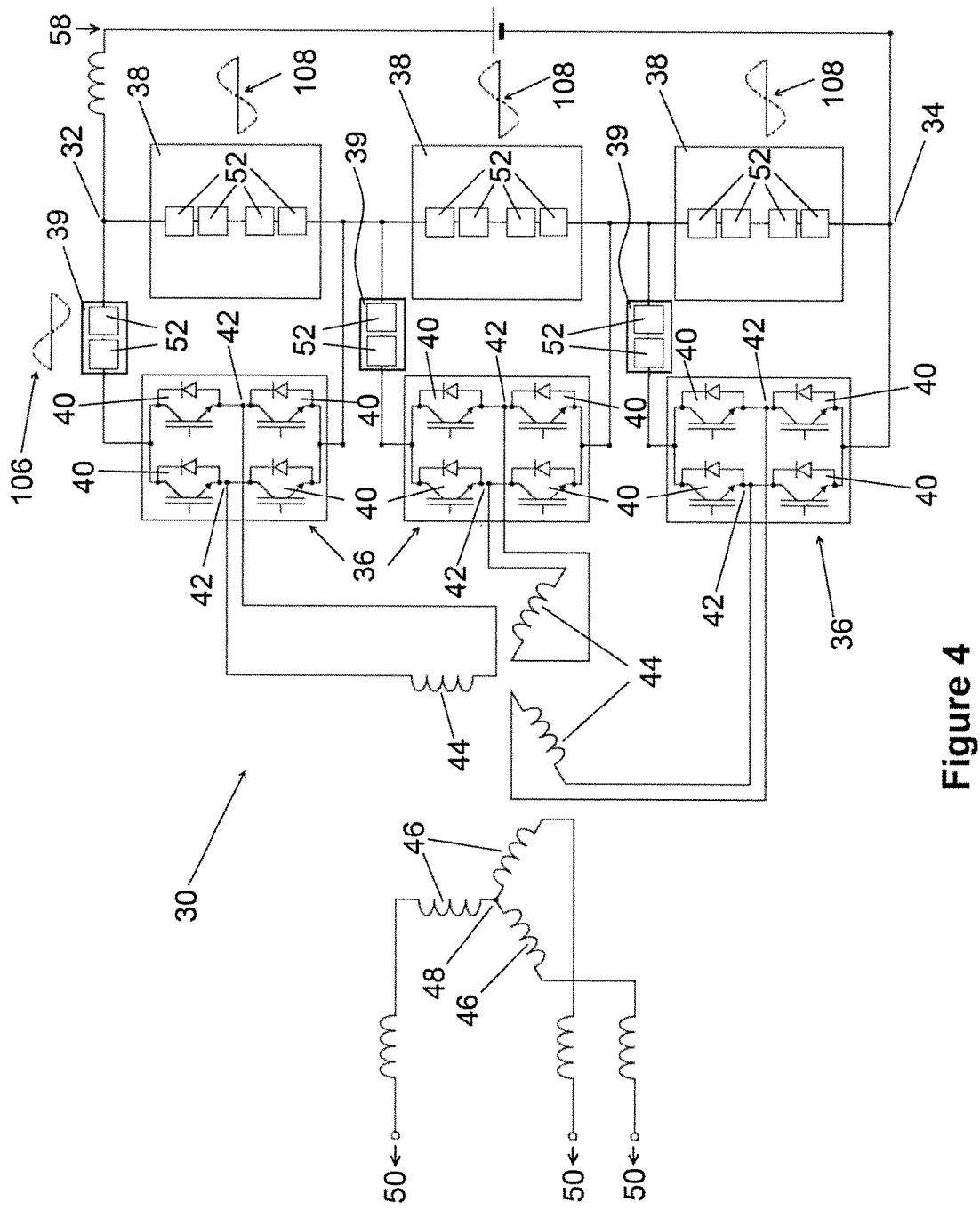
FIG. 4 illustrates, in schematic form, the operation of the voltage source converter of FIG. 1 to regulate the energy levels of its tertiary sub-converters.

The controller 60 is further configured to perform a first control function, which is selective control of each tertiary sub-converter 39 to synthesize at least one tertiary voltage component 106 so as to transfer energy to or from that tertiary sub-converter 39 and thereby regulate an energy level of that tertiary sub-converter 39, as shown in FIG. 4.

In the embodiment shown, the or each tertiary voltage component 106 is synthesized to have the same frequency as a current component of a current flowing through the corresponding tertiary sub-converter 39, and to be a positive integer multiple of a $2^{nd}$ harmonic voltage component.

In addition, in the embodiment shown, the or each tertiary voltage component 106 is synthesized to be in phase with a current component of a current flowing through that tertiary sub-converter 39. Control of each tertiary sub-converter 39 in this manner maximises the amount of energy transferred to or from each tertiary sub-converter 39, and thereby optimises the operation of the first voltage source converter 30 to regulate the energy level of each tertiary sub-converter 39.

The controller 60 is further configured to selectively control each auxiliary sub-converter 38 to synthesize an auxiliary voltage component 108 that is in anti-phase with the respective tertiary voltage component 106, as shown in FIG. 4. Control of each auxiliary sub-converter 38 ensures that the respective second DC voltage, and therefore the AC voltage at the AC side of the respective phase element 36, remains unmodified during the generation of the or each tertiary voltage component 106. Thus, energy level regulation of each tertiary sub-converter 39 may be carried out at any time during the operation of the first voltage source converter 30 without affecting the power transfer between the AC and DC electrical networks 50,58.

The product of the voltage and current of each tertiary sub-converter defines its power profile which, when integrated over time, provides an energy profile. Operation of the first voltage source converter 30 to transfer power between the AC and DC electrical networks 50,58 could result in energy accumulation in (or energy loss from) at least one capacitor 56, thus resulting in deviation of the energy level of at least one capacitor 56 from a reference value.

Such a deviation is undesirable because, if too little energy is stored within a given capacitor 56 then the voltage the corresponding module 52 is able to generate is reduced, whereas if too much energy is stored in a given capacitor 56 then over-voltage problems may arise. The former would require the addition of a power source to restore the energy level of the affected capacitor 56 to the reference value, while the latter would require an increase in voltage rating of one or more capacitors 56 to prevent the over-voltage problems, thus adding to the overall size, weight and cost of the first voltage source converter 30. In addition if too little energy is stored within a given capacitor 56 then the first voltage source converter 30 might trip due to under-voltage protection.

Figure 3:
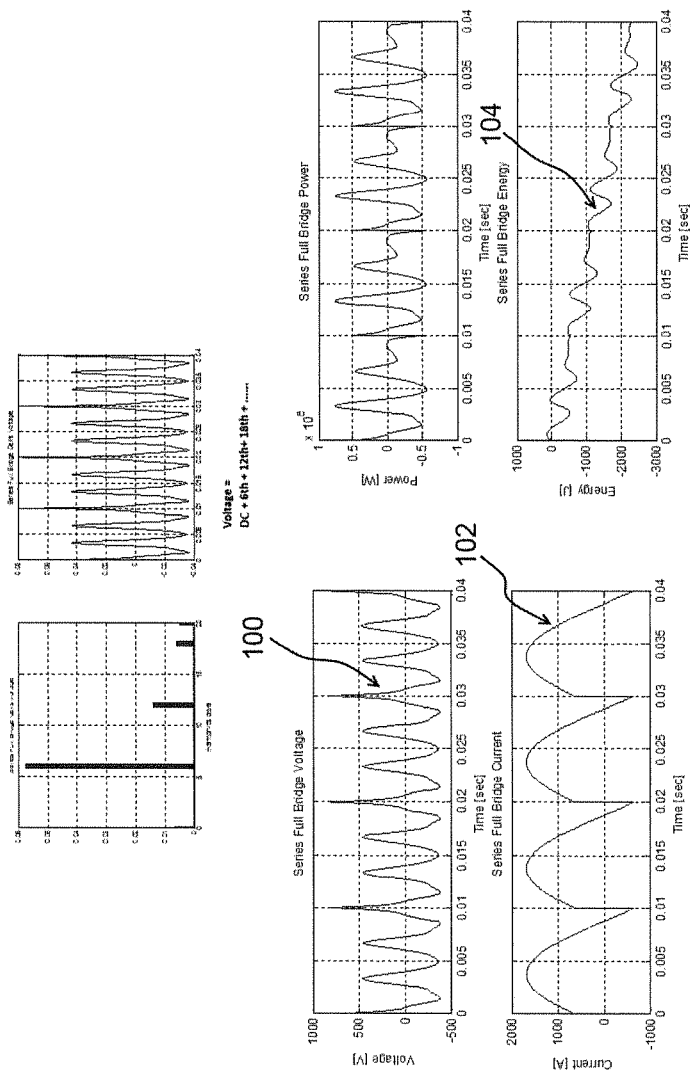
FIG. 3 illustrates, in graph form, the operation of the voltage source converter of FIG. 1 without energy regulation of the energy levels of its tertiary sub-converters.

FIG. 3 illustrates, in graph form, the operation of the first voltage source converter 30 without energy regulation of the energy levels of the tertiary sub-converters 39, when each tertiary sub-converter 39 is controlled to synthesize a voltage waveform 100 including harmonic components in the form of positive integer multiples of the $6^{th}$ harmonic component, and each tertiary sub-converter 39 conducts a current 102 in the form of a rectified sinusoidal waveform that contains a DC current and harmonic components in the form of positive integer multiples of the $2^{nd}$ harmonic component. It can be seen from FIG. 3 that there is a net energy transfer 104 from each tertiary sub-converter 39.

To regulate the energy levels of the tertiary sub-converters 39, the controller 60 controls each tertiary sub-converter 39 to synthesize at least one tertiary voltage component 106 so as to transfer energy to or from that tertiary sub-converter 39, as illustrated in FIG. 4.

Figure 5:
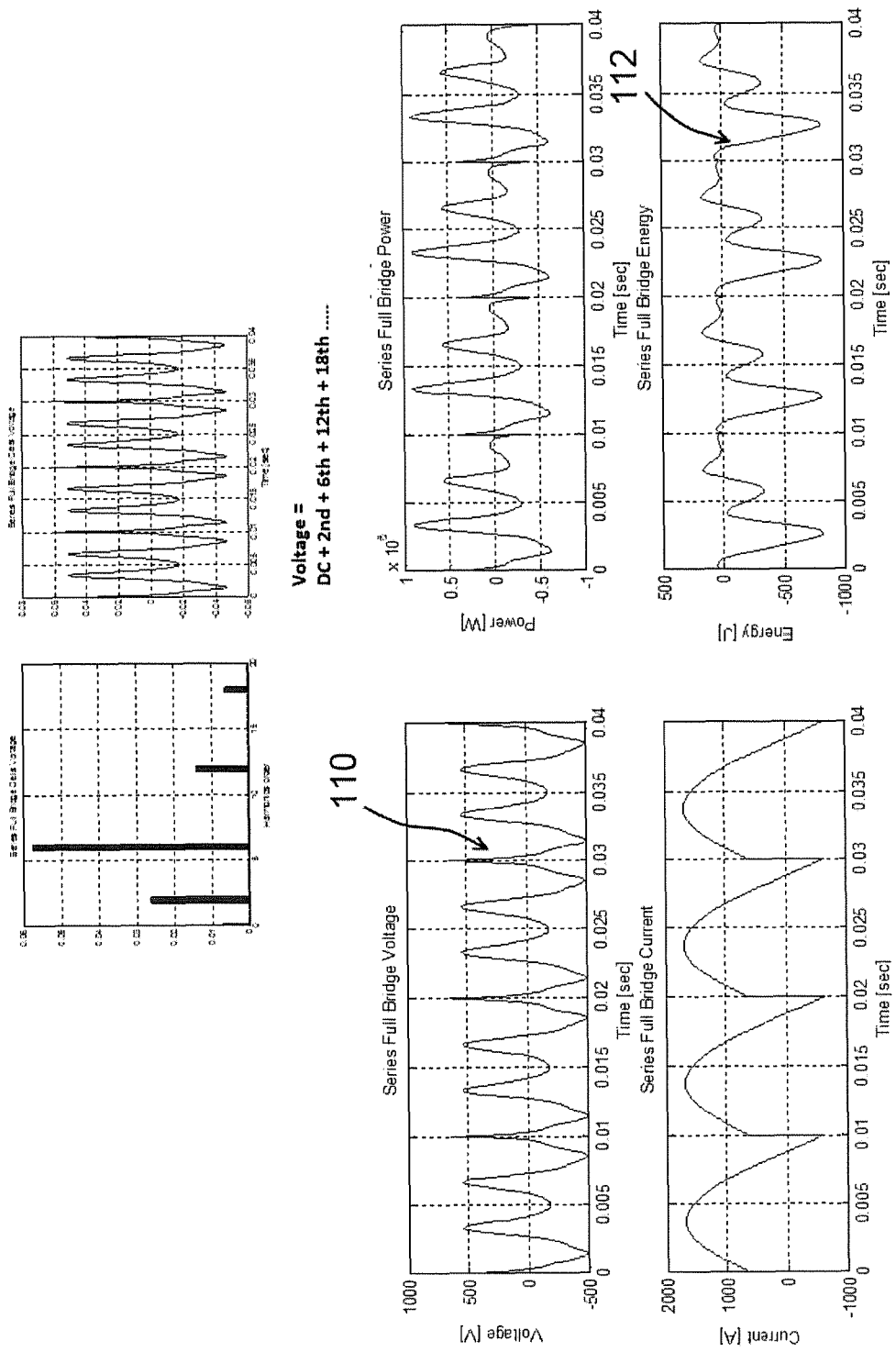
FIG. 5 illustrates, in graph form, the operation of the voltage source converter of FIG. 1 with energy regulation of the energy levels of its tertiary sub-converters.

FIG. 5 illustrates, in graph form, the operation of the first voltage source converter 30 with energy regulation of the energy levels of the tertiary sub-converters 39 when the controller 60 controls each tertiary sub-converter 39 to synthesize a voltage waveform 110 that contains a tertiary voltage component in the form of a $2^{nd}$ harmonic component. It can be seen from FIG. 5 that there is a zero net change in energy level 112 of each tertiary sub-converter 39 over a predefined period of time.

Figure 6:
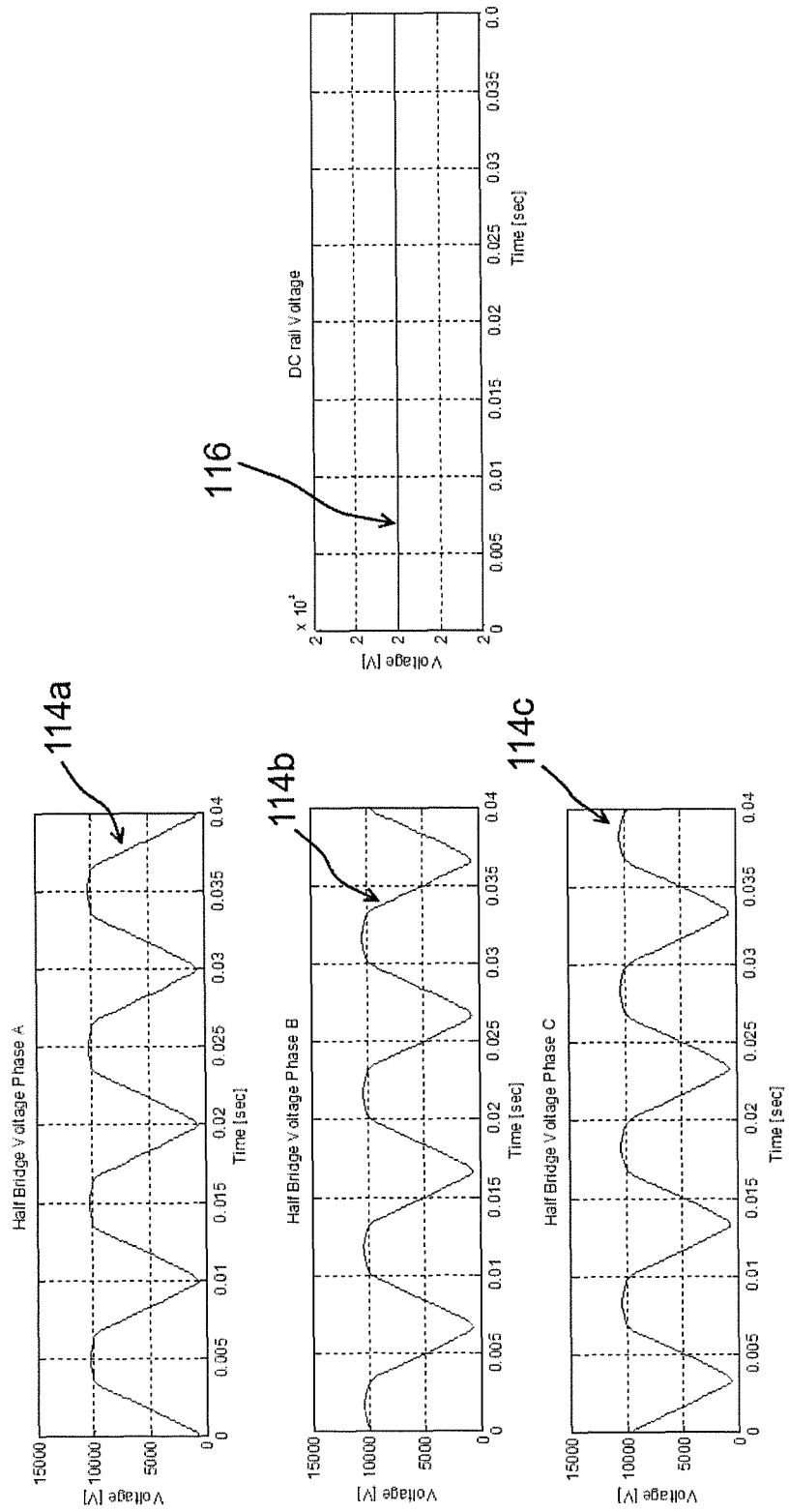
FIG. 6 shows, in schematic and graph form, the first DC voltages generated during the operation of the voltage source converter of FIG. 1.

FIG. 6 shows, in schematic and graph form, the first DC voltages 114a,114b,114c generated during the operation of the first voltage source converter 30. It can be seen from FIG. 6 that synthesis of the first DC voltages 114a,114b,114c to each contain a tertiary voltage component in the form of a $2^{nd}$ harmonic voltage component enables summation of the first DC voltages 114a,114b,114c, thus leaving a combined, ripple-free DC voltage 116 for presentation to the DC electrical network 58.

The configuration of the first voltage source converter 30 allows energy to be transferred to and from each tertiary sub-converter 39 to regulate the energy stored in one or more corresponding capacitors 56, thereby obviating the problems associated with a deviation of the energy level of at least one capacitor 56 from the reference value.

Regulation of the energy level of each tertiary sub-converter 39 may involve balancing of the energy levels of the plurality of tertiary sub-converters 39. This is useful when there is an imbalance in the energy levels of the plurality of tertiary sub-converters 39, which could be caused by, for example, an imbalance of the plurality of phase currents drawn from the AC electrical network 50, or component failure in one or more modules 52 of at least one tertiary sub-converter 39 leading to a reduction in energy storage capacity.

Optionally the controller 60 may be configured to selectively control each tertiary sub-converter 39 to modify a phase angle of the or each tertiary voltage component relative to a phase angle of a current flowing through each tertiary sub-converter 39. Control of each tertiary sub-converter 39 in this manner permits adjustment of the amount of energy transferred to or from each tertiary sub-converter 39, and thereby provides an additional way of regulating the energy level of each tertiary sub-converter 39.

There is provided a second voltage source converter according to a second embodiment of the invention. The second voltage source converter is similar in structure and operation to the first voltage source converter 30 of FIG. 1, and like features share the same reference numerals.

The second voltage source converter differs from the first voltage source converter 30 in that the controller 60 of the second voltage source converter is further configured to perform a second control function, which is selective control of:
  each auxiliary sub-converter 38 to modify the respective first DC voltage to include at least two auxiliary harmonic components, each auxiliary harmonic component being a positive integer multiple of a $2^{nd}$ harmonic component;
  each tertiary sub-converter 39 to synthesize a voltage waveform that includes at least one tertiary harmonic component, the or each tertiary harmonic component being a positive integer multiple of a $6^{th}$ harmonic component.

The controller 60 is further configured to selectively control each auxiliary sub-converter 38 to modify the respective first DC voltage to operate at a phase difference of 120 electrical degrees to the other two first DC voltages.

Figure 7:
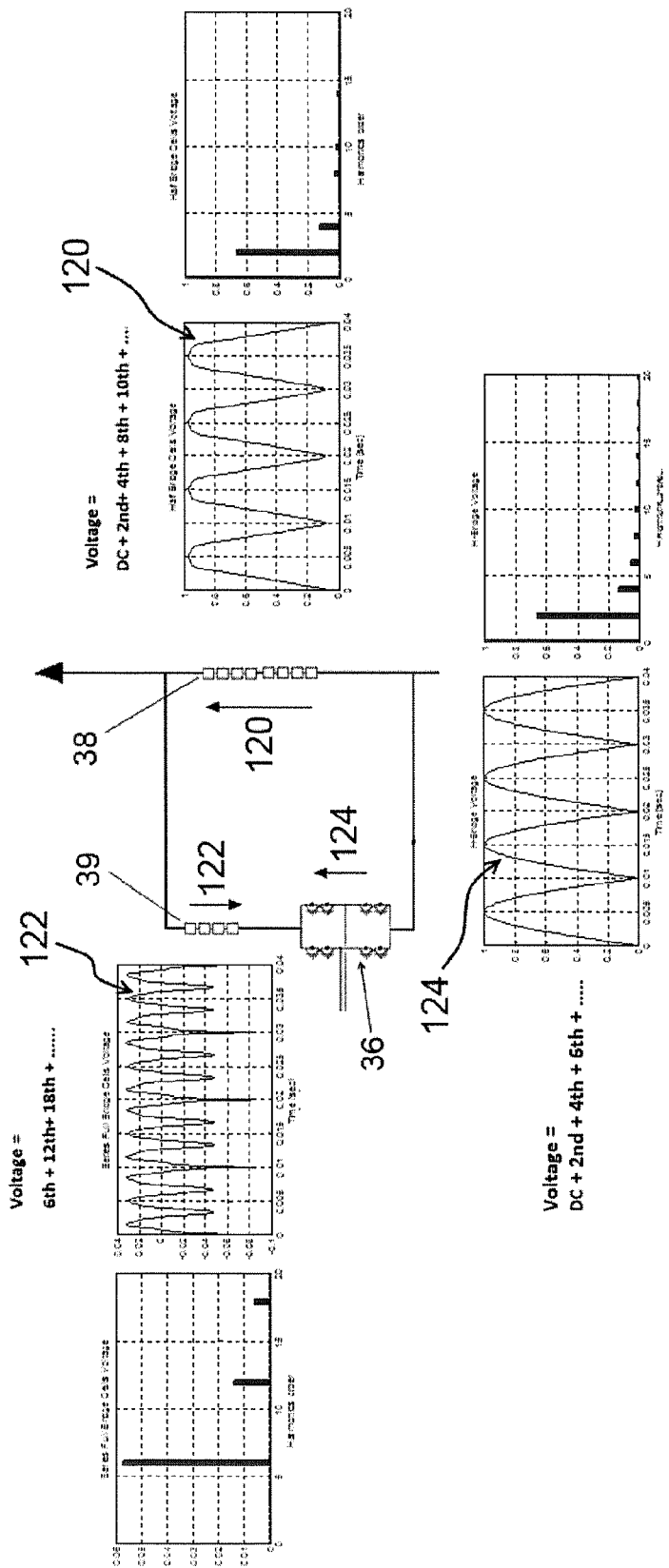
FIG. 7 shows, in schematic form, the operation of a voltage source converter according to a second embodiment of the invention.

Simultaneously controlling:
  each auxiliary sub-converter 38 to modify the respective first DC voltage 120 to include at least two auxiliary harmonic components, each auxiliary harmonic component being a positive integer multiple of a $2^{nd}$ harmonic component; and
  each tertiary sub-converter 39 to synthesize a voltage waveform 122 that includes at least one tertiary harmonic component, the or each tertiary harmonic component being a positive integer multiple of a $6^{th}$ harmonic component,
results in modification of the respective second DC voltage 124 into a near-approximation of an offset rectified sinusoidal waveform for presentation to the DC side of the respective phase element 36, as shown in FIG. 7. This results in formation of high quality AC sinusoidal waveforms with minimal harmonic distortion at the AC sides of the phase elements 36.

The control of each sub-converter 38,39 in the manner set out above not only results in cancellation of the auxiliary harmonic components when the first DC voltages are summed, thus leaving a combined, ripple-free DC voltage for presentation to the DC electrical network 58, but also actively filters undesirable ripple harmonic components, each of which is a positive integer multiple of a $6^{th}$ harmonic component, that are present in the respective second DC voltage and thereby prevents the undesirable ripple harmonic components from appearing in the respective first DC voltage presented to the DC electrical network 58.

Furthermore the control of each auxiliary sub-converter 38 to modify the respective first DC voltage to include the auxiliary harmonic components removes the need to control each tertiary sub-converter 39 to actively filter undesirable ripple harmonic components that are not positive integer multiples of a $6^{th}$ harmonic component, thus reducing the required voltage rating of each tertiary sub-converter 39.

In contrast, an alternative solution involves controlling each auxiliary sub-converter 38 to synthesize one or more zero-phase sequence triplen harmonic components (e.g. $3^{rd}$, $9^{th}$ and $15^{th}$ harmonic components) to cancel the undesirable ripple harmonic components, each of which is a positive integer multiple of a $6^{th}$ harmonic component, that are present in the first DC voltage. Synthesis of one or more zero-phase sequence triplen harmonic components by each auxiliary sub-converter 38 however means that use of a delta-connected plurality of transformer primary windings to interconnect the AC electrical network 50 and the AC side of each phase element 36 results in a driving voltage around the delta-connected plurality of transformer primary windings, thus providing a path for a significant, continuous zero-phase sequence current to flow in the delta-connected plurality of transformer primary windings. Similarly use of a star-connected plurality of transformer primary windings, with a grounded neutral point, to interconnect the AC electrical network 50 and the AC side 42 of each phase element 36 provides a path for a significant, continuous zero-phase sequence current to flow in the star-connected plurality of transformer primary windings.

On the other hand synthesis of a voltage waveform that includes at least one tertiary harmonic component by each tertiary sub-converter 39 obviates the need to control each auxiliary sub-converter 38 to synthesize one or more zero-phase sequence triplen harmonic components. This in turn permits use of the star-connected plurality of transformer primary windings 46 with a grounded neutral point, which could be desirable for high power applications.

There is provided a third voltage source converter according to a third embodiment of the invention. The third voltage source converter is similar in structure and operation to the second voltage source converter, and like features share the same reference numerals.

The third voltage source converter differs from the second voltage source converter in that the controller 60 of the third voltage source converter is further configured to perform a third control function, which is selective control of each tertiary sub-converter 39 to generate a compensatory DC voltage component for presentation to the DC side of the respective phase element 36 so as to compensate for a change in the respective second DC voltage caused by the change in real power and/or reactive power generated or absorbed at an AC side of the respective phase element 36 and thereby inhibit the change in the respective second DC voltage from modifying the respective first DC voltage.

During operation of the third voltage source converter, the first and second DC voltages in each limb may be set to be equal so that the respective tertiary sub-converter is not controlled to synthesize a DC voltage waveform. Since the third voltage source converter includes three limbs connected in series between the first and second DC terminals 32,34, each of the first and second DC voltages is equal to one-third of the voltage across the first and second DC terminals 32,34 (i.e. the voltage of the DC electrical network 58).

When the third voltage source converter is controlled to generate or absorb reactive power at the AC sides of its phase elements 36 (e.g. through switching of the switching elements 40 of the phase elements 36), the AC voltage at the AC side of each phase element 36 must increase or decrease in magnitude. An increase or decrease in the AC voltage at the AC side of each phase element 36 in turn results in an increase or decrease in the second DC voltage presented to the DC side of each phase element 36, which then causes an increase or decrease in each first DC voltage.

Consequently each first DC voltage will no longer be equal to one-third of the voltage across the first and second DC terminals 32,34 (i.e. the voltage of the DC electrical network 58).

Figure 8:
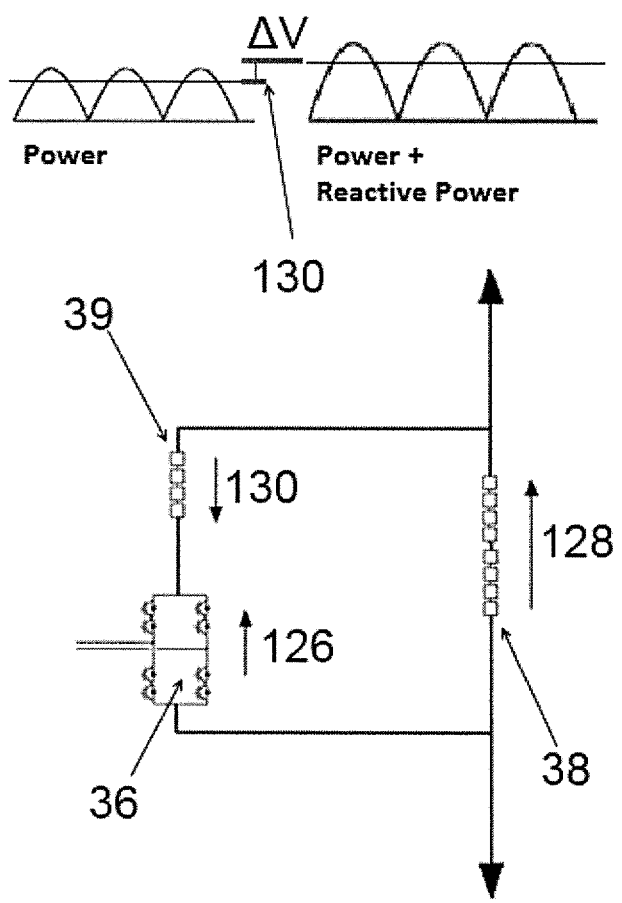
FIG. 8 shows, in schematic and graph form, the operation of a voltage source converter according to a third embodiment of the invention.

To inhibit the change in the respective second DC voltage 126 from modifying the respective first DC voltage 128, the controller 60 controls each tertiary sub-converter 39 to generate a compensatory DC voltage component 130 for presentation to the DC side of the respective phase element 36 so as to compensate for a change in the respective second DC voltage 126 caused by the change in reactive power generated or absorbed at an AC side of the respective phase element 36, as shown in FIG. 8.

Control of each tertiary sub-converter 39 in accordance with the third control function inhibits any effect a change in reactive power generated or absorbed at an AC side of the respective phase element 36 might have on the respective first DC voltage. This thereby prevents any undesirable change in the respective first DC voltage that would have otherwise resulted from the change in reactive power generated or absorbed at an AC side of the respective phase element 36.

The configuration of the third voltage source converter therefore permits operation of the third voltage source converter over a wide range of real power and reactive power with little to zero detrimental effect on the operation of the DC side of the third voltage source converter.

In contrast, an alternative solution involves controlling each auxiliary sub-converter 38 to synthesize one or more zero-phase sequence triplen harmonic components (e.g. $3^{rd}$, $9^{th}$ and $15^{th}$ harmonic components) to compensate for any change in the DC side of the third voltage source converter caused by a change in real power and/or reactive power generated or absorbed at an AC side of the respective phase element 36. As mentioned above, synthesis of one or more zero-phase sequence triplen harmonic components by each auxiliary sub-converter 38 however means that use of a delta-connected plurality of transformer primary windings to interconnect the AC electrical network 50 and the AC side of each phase element 58 results in a driving voltage around the delta-connected plurality of transformer primary windings, thus providing a path for a significant, continuous zero-phase sequence current to flow in the delta-connected plurality of transformer primary windings. Similarly use of a star-connected plurality of transformer primary windings, with a grounded neutral point, to interconnect the AC electrical network 50 and the AC side 42 of each phase element 36 provides a path for a significant, continuous zero-phase sequence current to flow in the star-connected plurality of transformer primary windings.

The control of each tertiary sub-converter 39 in accordance with the third control function obviates the need to control each auxiliary sub-converter 38 to synthesize one or more zero-phase sequence triplen harmonic components. This in turn permits use of a star-connected plurality of transformer primary windings 46 with a grounded neutral point, which could be desirable for high power applications.

There is provided a fourth voltage source converter according to a fourth embodiment of the invention. The fourth voltage source converter is similar in structure and operation to the third voltage source converter, and like features share the same reference numerals.

The fourth voltage source converter differs from the third voltage source converter in that the controller 60 of the fourth voltage source converter is further configured to perform a fourth control function, which is selective control of each tertiary sub-converter 39 and/or each auxiliary sub-converter 38 in a fault operating mode so as to minimise a fault current flowing or block a fault current from flowing through the fourth voltage source converter when a fault 150 occurs, in use, in the DC electrical network 58.

In addition, the fourth voltage source converter differs from the third voltage source converter in that each auxiliary sub-converter 38 of the voltage source converter includes a plurality of 4-quadrant bipolar modules 52.

It is envisaged that, in other embodiments of the invention, each 4-quadrant bipolar module of each auxiliary sub-converter may be replaced by another type of module that is capable of selectively providing a bidirectional voltage source. It is also envisaged that, in still other embodiments of the invention, each auxiliary sub-converter may include a combination of a plurality of 2-quadrant unipolar modules and a plurality of 4-quadrant bipolar modules.

A fault 150 (e.g. a low impedance short circuit) or other abnormal operating condition in the DC electrical network 58 may lead to high fault current flowing in the DC electrical network 58.

Figure 9:
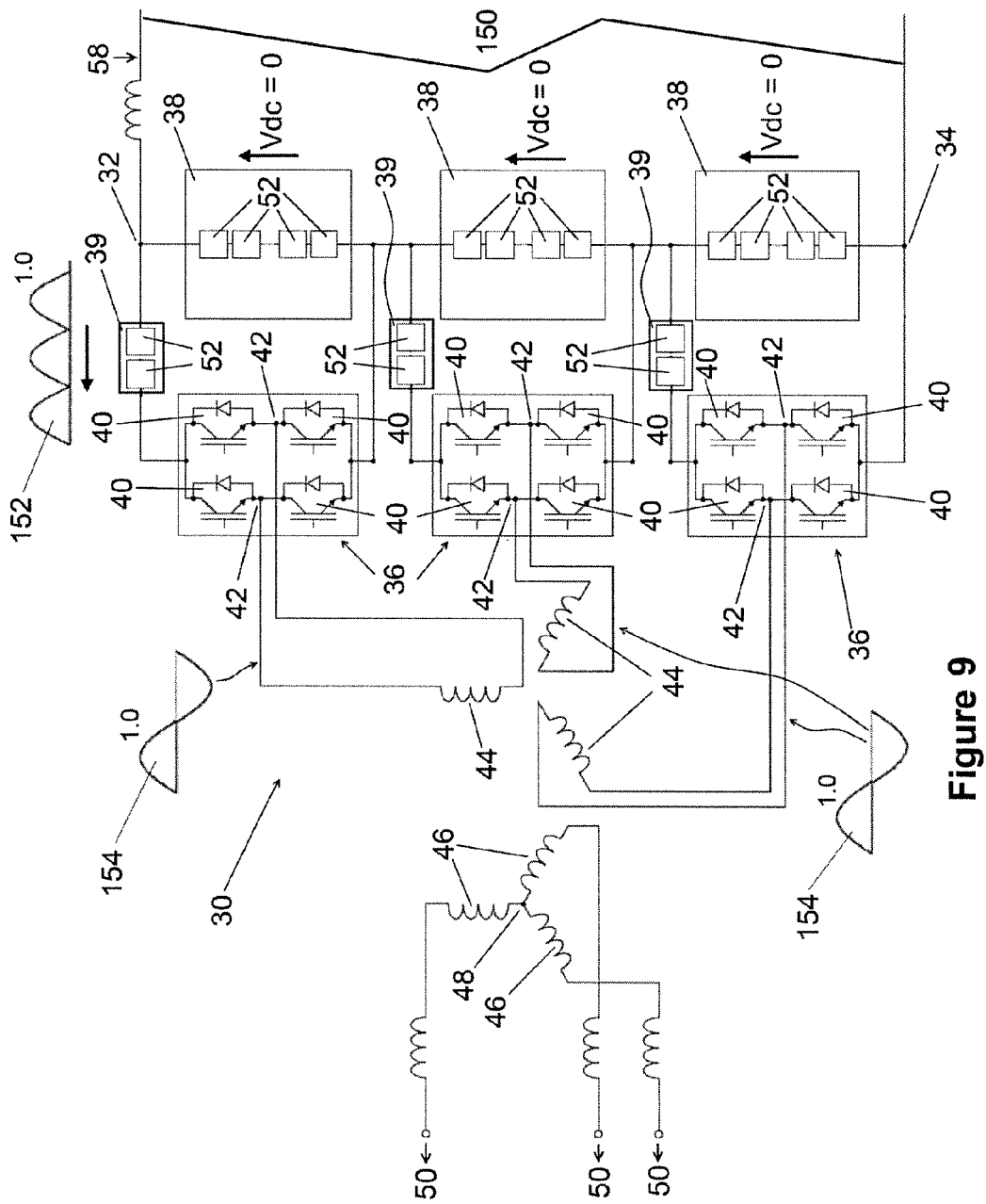
FIGS. 9 to 11 show, in schematic and graph form, the operation of a voltage source converter according to a fourth embodiment of the invention.

In response to an event of the fault 150 or other abnormal operating condition occurring in the DC electrical network 58, the controller 60 controls each auxiliary sub-converter 38 in the fault operating mode to set the respective first DC voltage to zero so as to provide a zero DC voltage across the first and second DC terminals 32,34, as shown in FIG. 9. This inhibits a fault current from flowing between the first and second DC terminals 32,34 via each auxiliary sub-converter 38.

Alternatively, to provide the zero DC voltage across the first and second DC terminals 32,34, the controller 60 controls each auxiliary sub-converter 38 in the fault operating mode to synthesize at least one auxiliary voltage component that is a positive integer multiple of a $2^{nd}$ harmonic component. Preferably the or each auxiliary voltage component is a $2^{nd}$ harmonic component, a $4^{th}$ harmonic component, an $8^{th}$ harmonic component or a $10^{th}$ harmonic component. Such synthesis of at least one auxiliary voltage component that is a positive integer multiple of a $2^{nd}$ harmonic component enables summation of a plurality of first DC voltages to define a zero DC voltage for presentation to the faulty DC electrical network 58.

Meanwhile, as shown in FIG. 9, the controller 60 controls each tertiary sub-converter 39 in the fault operating mode so as to synthesize an opposing voltage 152 to match or exceed an AC voltage 154 of a respective phase of the AC electrical network 50 that drives the flow of a fault current from the AC electrical network 50 to the DC electrical network 58 via the fourth voltage source converter. In the embodiment shown, when an AC voltage 154 of the respective phase AC electrical network 50 is in the form of a sinusoidal waveform, the opposing voltage 152 is synthesized in the form of an off-set rectified sinusoidal voltage waveform.

The provision of the opposing voltage to match an AC voltage of the AC electrical network 50 means there is no longer any driving voltage that can drive the flow of a fault current from the AC electrical network 50 to the DC electrical network 58 via the fourth voltage source converter, thus blocking a fault current from flowing in the fourth voltage source converter.

Figure 10:
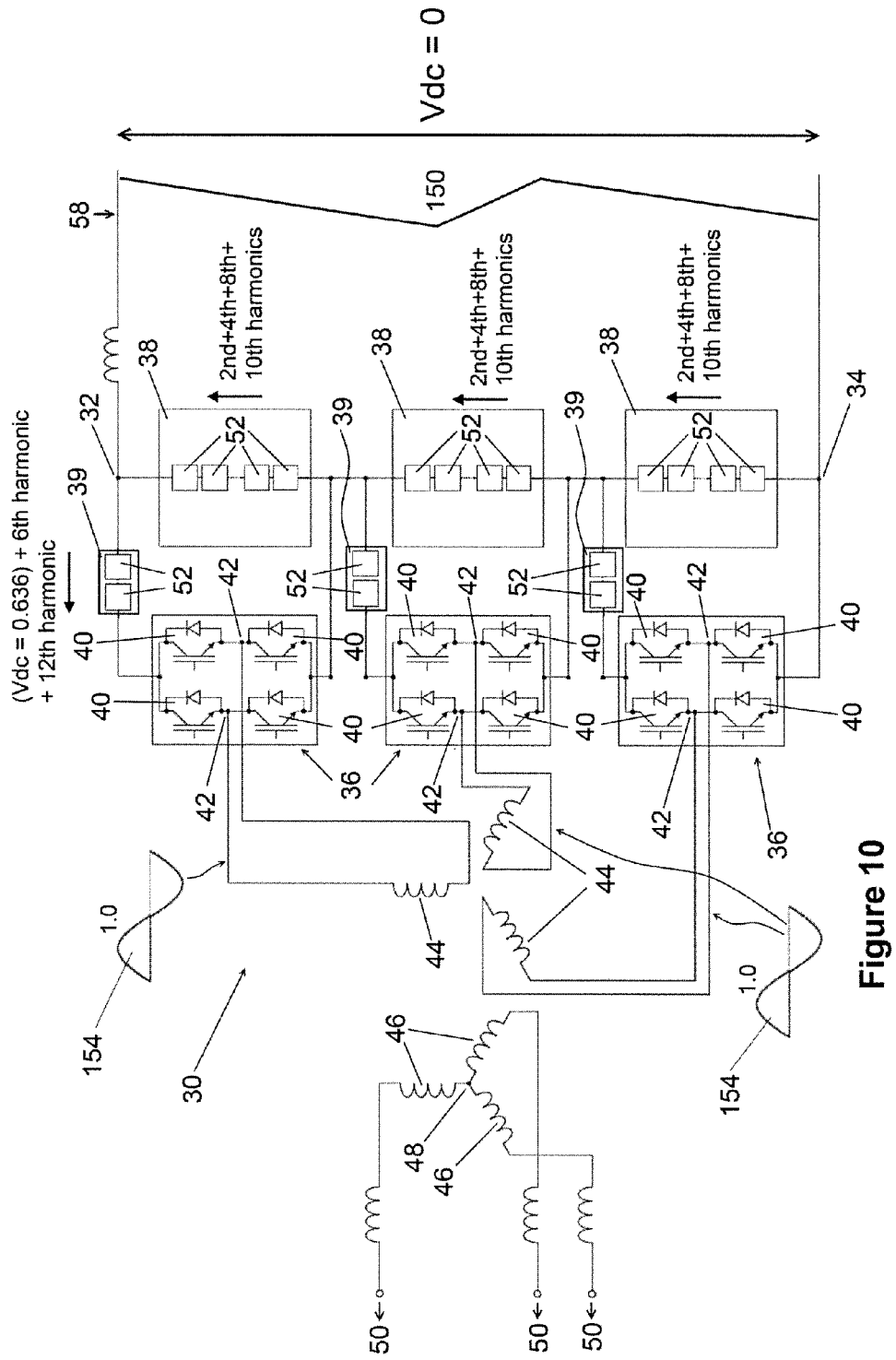

Optionally the controller 60 may control each tertiary sub-converter 39 and each auxiliary sub-converter 38 in the fault operating mode to synthesize the opposing voltage (e.g. an off-set rectified sinusoidal voltage waveform). More particularly, in the fault operating mode, the controller 60 controls each tertiary sub-converter 39 to synthesize a DC voltage that is $2/\pi$ of the peak AC voltage at an AC side of the respective phase element 36 together with two tertiary voltage components in the form of $6^{th}$ and $12^{th}$ harmonic components, and controls each auxiliary sub-converter 38 to synthesize auxiliary voltage components in the form of $2^{nd}$, $4^{th}$, $8^{th}$ and $10^{th}$ harmonic components, as shown in FIG. 10. The opposing voltage is therefore a combination of the DC voltage, each tertiary voltage component and each auxiliary voltage component.

Such control of each tertiary sub-converter 39 and each auxiliary sub-converter 38 in the fault operating mode to synthesize the opposing voltage therefore permits distribution of the opposing voltage between the auxiliary and tertiary sub-converters 38,39, and thereby reduces the required individual voltage ratings of each tertiary sub-converter 39 and each auxiliary sub-converter 38 to enable synthesis of the opposing voltage.

As mentioned earlier, such synthesis of the auxiliary voltage components that are positive integer multiples of a $2^{nd}$ harmonic component enables summation of a plurality of first DC voltages to define a zero DC voltage for presentation to the faulty DC electrical network 58.

In addition control of each tertiary sub-converter 39 to synthesize the tertiary voltage components that are positive integer multiples of a $6^{th}$ harmonic component permits active filtering of undesirable ripple harmonic components, each of which is a positive integer multiple of a $6^{th}$ harmonic component, that are present in the respective second DC voltage and thereby prevents the undesirable ripple harmonic components from appearing in the respective first DC voltage presented to the DC electrical network 58.

It will be appreciated that each tertiary sub-converter 39 and each auxiliary sub-converter 38 may be controlled in the fault operating mode to each synthesize a variety of other types of voltages in order to synthesize the opposing voltage.

It is envisaged that, in other embodiments of the invention, the opposing voltage is synthesized to minimise the fault current flowing through the fourth voltage source converter, instead of blocking a fault current from flowing in the fourth voltage source converter.

Figure 11:
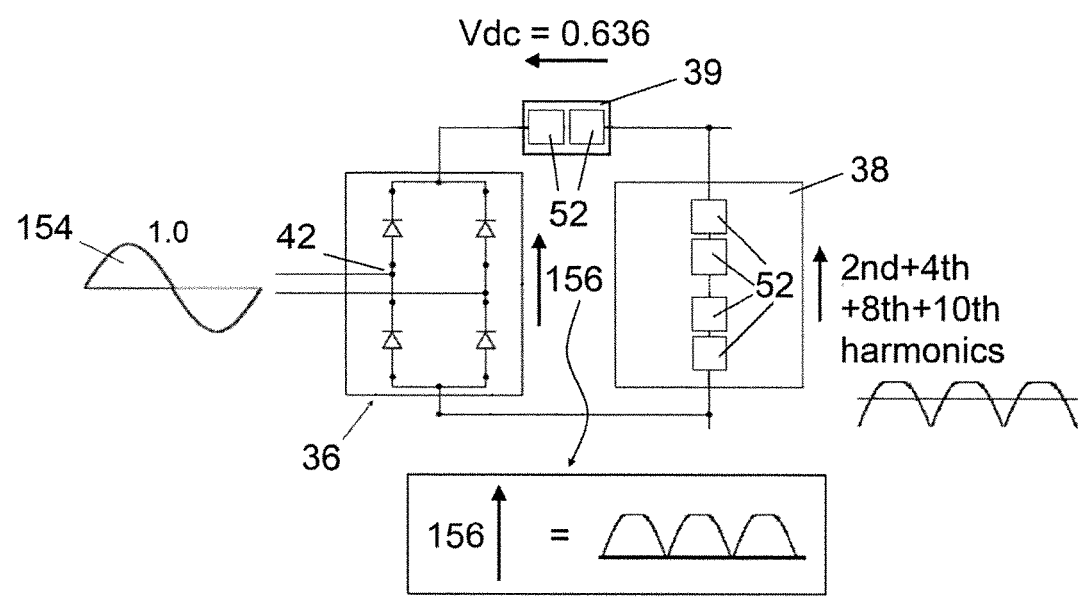

Further optionally, when each switching device 40 of each phase element 36 is turned off to effectively modify each phase element 36 into a diode rectifier, the controller 60 may control each tertiary sub-converter 39 to synthesize a DC voltage that is 2/it of the peak AC voltage at an AC side of the respective phase element 36, and control each auxiliary sub-converter 38 to synthesize auxiliary voltage components in the form of $2^{nd}$, $4^{th}$, $8^{th}$ and $10^{th}$ harmonic components in the fault operating mode to synthesize a combined voltage waveform 156 so as to reverse bias the plurality of diodes of the respective phase element 36 and thereby inhibit the respective phase element 36 from conducting current, as shown in FIG. 11. This blocks a fault current from flowing from the AC electrical network 50 to the DC electrical network 58 via the fourth voltage source converter.

It is envisaged that, in other embodiments of the invention, the controller may control each tertiary sub-converter or each auxiliary sub-converter in the fault operating mode to synthesize a voltage waveform so as to reverse bias the plurality of passive current check elements of the respective phase element so as to inhibit the respective phase element from conducting current.

The inclusion of the controller 60 in the fourth voltage source converter therefore permits control of each tertiary sub-converter 39 and each auxiliary sub-converter 38, which is normally used to facilitate transfer of power between the AC and DC electrical networks 50,58, to reliably minimise or block a fault current. This thereby reduces or eliminates the need for additional fault current protection hardware (e.g. circuit breakers and surge arresters) to protect the fourth voltage source converter from any detrimental effects of the fault current, thus resulting in an economical, space-saving fourth voltage source converter that is capable of transferring power between the AC and DC electrical networks 50,58, but also minimising a fault current or blocking flow of a fault current through the voltage source converter resulting from a fault 150 in the DC electrical network 58.

In the embodiments shown, the AC side 42 of each phase element 36 is connected to a respective phase of a three-phase AC electrical network 50. It is envisaged that, in other embodiments, the number of limbs in the voltage source converter may vary with the number of phases of a multi-phase AC electrical network, and the AC side of each phase element may be connected to a respective phase of the multi-phase phase AC electrical network.

It will be appreciated that the controller of the second voltage source converter may be configured to omit the capability to perform the first control function. It will be also appreciated that the controller of the third voltage source converter may be configured to omit the capability to perform either or each of the first and second control functions. It will be further appreciated that the controller of the fourth voltage source converter may be configured to omit the capability to perform each of the first, second and third control functions.

The invention claimed is:

1. A voltage source converter comprising first and second DC terminals for connection to a DC electrical network, the voltage source converter further including at least one limb connected between the first and second DC terminals, the or each limb including:
   a phase element including a plurality of switching elements to interconnect the DC electrical network and an AC electrical network;
   an auxiliary sub-converter configured to be controllable to act as a waveform synthesizer to modify a first DC voltage presented to the DC electrical network; and
   a tertiary sub-converter connected with the phase element in an electrical block, the auxiliary sub-converter being connected in parallel with the electrical block, the tertiary sub-converter being configured to be controllable to act as a waveform synthesizer to modify a second DC voltage presented to a DC side of the phase element, the tertiary sub-converter including at least one energy storage device;
   wherein the voltage source converter further includes a controller configured to selectively control the or each tertiary sub-converter to synthesize at least one tertiary voltage component so as to transfer energy to or from that tertiary sub-converter and thereby regulate an energy level of that tertiary sub-converter.

2. A voltage source converter according to claim 1 wherein the controller is configured to selectively control the or each tertiary sub-converter to synthesize at least one tertiary voltage component so as to transfer energy to or from that tertiary sub-converter and thereby minimise a net change in energy level of that tertiary sub-converter.

3. A voltage source converter according to claim 1 wherein the controller is configured to selectively control the or each auxiliary sub-converter to synthesize an auxiliary voltage component that is in anti-phase with the respective tertiary voltage component.

4. A voltage source converter according to claim 1 wherein the or each tertiary voltage component is a $2^{nd}$ harmonic voltage component, a $4^{th}$ harmonic component, an $8^{th}$ harmonic component or a $10^{th}$ harmonic component.

5. A voltage source converter according to claim 1 wherein the or each tertiary voltage component is a $(3(2n-1)\pm1)^{th}$ harmonic voltage component, whereby n is a positive integer multiple.

6. A voltage source converter according to claim 1 wherein the or each tertiary voltage component has the same frequency as a current component of a current flowing through the corresponding tertiary sub-converter.

7. A voltage source converter according to claim 1 wherein the controller is configured to selectively control the or each tertiary sub-converter to modify a phase angle of the or each tertiary voltage component relative to a phase angle of a current flowing through the or each tertiary sub-converter.

8. A voltage source converter according to claim 1 wherein the controller is configured to selectively control the or each tertiary sub-converter to synthesize the or each tertiary voltage component to be in phase with a current component of a current flowing through that tertiary sub-converter.

9. A voltage source converter comprising first and second DC terminals for connection to a DC electrical network, the voltage source converter further including a plurality of limbs connected between the first and second DC terminals, each limb including:
  a phase element including a plurality of switching elements to interconnect the DC electrical network and an AC electrical network; and
  an auxiliary sub-converter configured to be controllable to act as a waveform synthesizer to modify a first DC voltage presented by the limb to the DC electrical network,
  wherein the voltage source converter further includes a controller configured to selectively control each auxiliary sub-converter to modify the respective first DC voltage to include at least two auxiliary harmonic components, each auxiliary harmonic component being a positive integer multiple of a $2^{nd}$ harmonic component.

10. A voltage source converter according to claim 9 wherein each auxiliary harmonic component is a $2^{nd}$ harmonic component, a $4^{th}$ harmonic component, an $8^{th}$ harmonic component or a $10^{th}$ harmonic component.

11. A voltage source converter according to claim 9 wherein each limb further includes a tertiary sub-converter configured to be controllable to act as a waveform synthesizer to modify a respective second DC voltage presented to a DC side of the respective phase element, and the controller is configured to selectively control each tertiary sub-converter to synthesize a voltage waveform that includes at least one tertiary harmonic component, the or each tertiary harmonic component being a positive integer multiple of a $6^{th}$ harmonic component.

12. A voltage source converter according to claim 9 wherein each limb further includes a tertiary sub-converter configured to be controllable to act as a waveform synthesizer to modify a second DC voltage presented to a DC side of the corresponding phase element, and the controller is configured to selectively control each tertiary sub-converter to modify the respective second DC voltage into a near-approximation of an offset rectified sinusoidal waveform for presentation to the DC side of the respective phase element when the respective auxiliary sub-converter is controlled to modify the respective first DC voltage to include the auxiliary harmonic components.

13. A voltage source converter comprising first and second DC terminals for connection to a DC electrical network, the voltage source converter further including at least one limb connected between the first and second DC terminals, the or each limb including:
  a phase element including a plurality of switching elements to interconnect the DC electrical network and an AC electrical network;
  an auxiliary sub-converter configured to be controllable to act as a waveform synthesizer to modify a first DC voltage presented to the DC electrical network; and
  a tertiary sub-converter connected with the phase element in an electrical block, the auxiliary sub-converter being connected in parallel with the electrical block, the tertiary sub-converter being configured to be controllable to act as a waveform synthesizer to modify a second DC voltage presented to a DC side of the phase element,
  wherein the voltage source converter further includes a controller configured to selectively control the or each tertiary sub-converter to generate a compensatory DC voltage component for presentation to the DC side of the or the respective phase element so as to compensate for a change in real power and/or reactive power generated or absorbed at an AC side of the or the respective phase element.

14. A voltage source converter according to claim 13 wherein the controller is configured to selectively control the or each tertiary sub-converter to generate a compensatory DC voltage component for presentation to the DC side of the or the respective phase element so as to compensate for a change in the or the respective second DC voltage caused by the change in real power and/or reactive power generated or absorbed at an AC side of the or the respective phase element.

15. A voltage source converter according to claim 14 wherein the controller is configured to selectively control the or each tertiary sub-converter to generate a compensatory DC voltage component for presentation to the DC side of the or the respective phase element so as to compensate for a change in the or the respective second DC voltage caused by the change in real power and/or reactive power generated or absorbed at an AC side of the or the respective phase element and thereby inhibit the change in the or the respective second DC voltage from modifying the or the respective first DC voltage.

16. A voltage source converter comprising first and second DC terminals for connection to a DC electrical network, the voltage source converter further including at least one limb connected between the first and second DC terminals, the or each limb including:
  a phase element including a plurality of switching elements to interconnect the DC electrical network and an AC electrical network;
  an auxiliary sub-converter configured to be controllable to act as a waveform synthesizer to modify a first DC voltage presented to the DC electrical network; and
  a tertiary sub-converter connected with the phase element in an electrical block, the auxiliary sub-converter being connected in parallel with the electrical block, the tertiary sub-converter being configured to be controllable to act as a waveform synthesizer to modify a second DC voltage presented to a DC side of the phase element, wherein the voltage source converter further includes a controller configured to selectively control the or each tertiary sub-converter and/or the or each auxiliary sub-converter in a fault operating mode so as to minimise a fault current flowing or block a fault current from flowing through the voltage source converter when a fault occurs, in use, in the DC electrical network.

17. A voltage source converter according to claim 16 wherein the controller selectively control the or each auxiliary sub-converter in the fault operating mode so as to provide a zero DC voltage across the first and second DC terminals and thereby block a fault current from flowing through the voltage source converter when a fault occurs, in use, in the DC electrical network.

18. A voltage source converter according to claim 16 wherein the controller is configured to selectively control the or each tertiary sub-converter and/or the or each auxiliary sub-converter in the fault operating mode so as to synthesize an opposing voltage that minimises a fault current flowing or blocks a fault current from flowing through the voltage source converter when a fault occurs, in use, in the DC electrical network.

19. A voltage source converter according to claim 16 wherein the controller is configured to selectively control the or each tertiary sub-converter in the fault operating mode to synthesize a DC voltage, preferably a DC voltage that is 2/it of the peak AC voltage at an AC side of the or the respective phase element, and to optionally synthesize at least one tertiary voltage component, the or each tertiary voltage component being a positive integer multiple of a $6^{th}$ harmonic component, so as to synthesize the opposing voltage.

20. A voltage source converter according to claim 16 wherein the controller is configured to selectively control the or each auxiliary sub-converter in the fault operating mode to synthesize at least one auxiliary voltage component, the or each auxiliary voltage component being a $2^{nd}$ harmonic component, a $4^{th}$ harmonic component, an $8^{th}$ harmonic component or a $10^{th}$ harmonic component.

21. A voltage source converter according to claim 20 wherein the or each auxiliary sub-converter is configured as a bidirectional waveform synthesizer.

22. A voltage source converter according to claim 16 wherein the controller is configured to selectively control the or each tertiary sub-converter and/or the or each auxiliary sub-converter in the fault operating mode to synthesize a voltage waveform so as to inhibit the or the respective phase element from conducting current.

23. A voltage source converter according to claim 16 including a plurality of limbs connected in series between the first and second DC terminals.

24. A voltage source converter according to claim 16 wherein the or each sub-converter includes at least one module, the or each module including at least one switching element and at least one energy storage device, the or each switching element and the or each energy storage device in the or each module combining to selectively provide a voltage source.

* * * * *